United States Patent [19]
Kan et al.

[11] 3,864,275
[45] Feb. 4, 1975

[54] PROCESS FOR ENVELOPING FINE DROPS OF DISPERSED LIQUIDS

[75] Inventors: Masao Kan, Chigasaki; Hiroshi Hyodo, Tokyo; Hirofusa Matsuoka, Kamakura; Akio Watanabe, Kanagawa; Shigekazu Enami, Hiratsuka, all of Japan

[73] Assignee: Pilot Man-Nen-Hitsu Kabushiki Kaisha, Tokyo, Japan

[22] Filed: Nov. 21, 1972

[21] Appl. No.: 308,453

Related U.S. Application Data

[60] Division of Ser. No. 30,963, April 22, 1970, , which is a continuation-in-part of Ser. No. 405,258, Oct. 20, 1964, abandoned.

[30] Foreign Application Priority Data

| Oct. 21, 1963 | Japan | 38-56555 |
| Dec. 13, 1963 | Japan | 38-66527 |
| Sept. 9, 1964 | Japan | 39-51808 |
| Sept. 9, 1964 | Japan | 39-51809 |
| Sept. 9, 1964 | Japan | 39-51810 |

[52] U.S. Cl. ............... 252/316, 8/79, 117/36.2, 117/100 A, 117/100 B, 252/62.2, 252/364, 252/518, 264/4, 424/32

[51] Int. Cl. ............... B01j 13/02, B44d 1/02
[58] Field of Search.. 252/316; 117/100 A, 161 UN, 117/161 ZB; 424/32; 264/4

[56] References Cited
UNITED STATES PATENTS

| 2,847,395 | 8/1958 | Wear | 117/161 ZB X |
| 3,270,100 | 8/1966 | Jolkovski et al. | 252/316 X |
| 3,427,250 | 2/1969 | Haas et al. | 252/316 |

*Primary Examiner*—Richard D. Lovering
*Attorney, Agent, or Firm*—Wenderoth, Lind & Ponack

[57] ABSTRACT

Essential ingredients for the preparation of polymers are separately incorporated into continuous and discontinuous phases of a hydrophilic/hydrophobic dispersion in order to form at the interface thereof a polymer insoluble in both phases and which encapsulates that which is in the discontinuous phase. In the hydrophilic liquid, the reactant is a polyamine selected from the group consisting of tetramethylene diamine, pentamethylene diamine, hexamethylene diamine, and an epoxy resin-amine addition compound, and in the hydrophobic liquid, the reactant is epichlorohydrin.

2 Claims, No Drawings

PROCESS FOR ENVELOPING FINE DROPS OF DISPERSED LIQUIDS

This is a division of Ser. No. 30,963, filed Apr. 22, 1970, which in turn is a continuation-in-part of Ser. No. 405,258, filed Oct. 20, 1964, now abandoned.

BACKGROUND OF THE INVENTION

1. Field of the Invention

This invention relates to a method for enveloping or encapsulating fine drops of a dispersed hydrophilic liquid and of a hydrophobic liquid by causing a polyaddition reaction to take place at the interface between the hydrophilic and hydrophobic liquids to form a polymer film which is insoluble in both liquids, is fine, and of high strength.

In one aspect, the present invention provides a method in which two reactants are elected, (1) a hydrophobic liquid itself or a hydrophobic substance chosen from those soluble in a hydrophobic medium, the medium and the substance form a hydrophobic liquid and (2) a hydrophilic liquid itself or a hydrophilic substance chosen from those soluble in a hydrophilic medium, the medium and the substance form a hydrophilic liquid, and these two types of reactants are then properly combined into a pair in such a way that both react to cause polyaddition at the interface between the hydrophilic and hydrophobic liquids to produce a polymer coating film insoluble in both liquids. Thus, one of the pair of reactants is the hydrophobic liquid, or is contained in the hydrophobic medium, and the other member of the pair is the hydrophilic liquid, or is contained in the hydrophilic medium, and one of the liquids is dispersed, in the form of line drops, into the other liquid to cause a polyaddition reaction to take place between the reactants at the interface between the liquids to form a polymer coating film insoluble in both liquids, whereby the fine drops of the dispersed liquid can be encapsulated into the polymer coating film.

2. Discussion of the Prior Art

In the methods heretofore known for making capsules containing a liquid dispersed in the form of fine drops by enveloping the liquid by means of various materials, the capsules are made through complex-coacervation, using protective colloids such as gelatine and gum arabic, or through the polymerization of a monomer, intermediate or precondensate by adding a polymerization starter, accelerator or catalyst. In the former method, however, a large number of complicated processes must be performed with a high degree of precision to make capsules, therefore requiring considerable time to carry out the method. Furthermore, the capsules thus formed have a low strength, so the capsules are easily ruptured in handling by even minute pressure, resulting in seepage of the liquid contained therein. In the latter method, the adjustment of the polymerization conditions is extremely difficult, and it is almost impossible to make the capsule wall of uniform thickness because of the influence of many factors, such as the quantity of resin, the quantities of polymerization starter, accelerator, or catalyst, the time of their addition, the temperature of the reaction, and the time of the reaction.

Furthermore, polymer lumps consisting only of resin which do not envelope the dispersed liquid in the form of fine drops are formed, the yield of the capsules being thereby lowered very greatly.

As methods of producing a polymer by causing reaction between a pair of reactants at the interface between a hydrophilic liquid and a hydrophobic liquid, there have been known methods such as described in U.S. Pat. Nos. 3,078,242 and 3,270,100.

U.S. Pat. No. 3,078,242 teaches a method of producing a shaped structure in continuous fiber or film form by first causing a polycondensation reaction between a pair of intermediates such as dicarboxylic acid halides and diamines at the interface of the two liquids, and then depositing the condensed polymer resulting from the polycondensation reaction on preformed polymer particles (such as polytrifluorochloroethylene, polytetrafluoroethylene, polyvinylfluoride, or polyacrylonitrile) which were previously dispersed in the liquid. According to this patent, it is apparent that the polymer is formed from the polycondensation reaction which takes place at the interface of the two liquids, the reaction of which is represented by the following chemical equation.

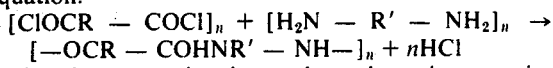

$$[ClOCR - COCl]_n + [H_2N - R' - NH_2]_n \rightarrow [-OCR - COHNR' - NH-]_n + nHCl$$

The above reaction is a polycondensation reaction between dicarboxylic acid halide and diamine to produce polyamide and hydrochloric acid as a by-product, and is not a polyaddition reaction. Further, the patented invention provides a method for producing continuous film or filament by depositing preformed polymer particles upon or within the condensation polymer formed at the interface of the reactants, which is entirely different from the present invention for production of micro-capsules, in each of which fine drops of the dispersed liquid are enveloped.

U.S. Pat. No. 3,270,100 (Jolkovski) discloses a method for making capsules which may contain an aqueous or organic liquid by discharging liquid particles of one bifunctional reactant into a solvent solution of another bifunctional reactant which is capable of reacting quickly with the liquid particles to condense and form a polymer on the surface of the particle. In the specification (column 1, lines 43 to 51) of this patent, "bifunctional reactant" is defined as a low molecular weight organic compound having two similar or dissimilar reactive groups selected from the group consisting of amino and amino—NHR, wherein R is H or alkali; phenolic—OH; and —SH, and "another bifunctional reactant" is defined as a low molecular weight organic compound having two reactive groups, each of which is capable of reacting with ethyl alcohol at room temperature to yield a compound having two ester groups.

For "one bifunctional reactant," there are (a) R'HN—R—NHR', (b) HO—R—OH, and (c) HS—R—SH, and for "another bifunctional reactant," there are (d) ClOC—R—COCl, (e) ClO$_2$S—R—SO$_2$Cl, (f) COCl$_2$, (g) SOCl$_2$, (h) SO$_2$Cl$_2$, and (i) POCl$_2$. Accordingly, combination of any one of the above reactants (a), (b) and (c) with any one of the above reactants (d) to (i) produces the expected polymer through a reaction which takes place at the interface of the reactants. The total number of combinations is 18, and the type of reaction which occurs in every combination of the above listed reactants is a polycondensation reaction. For example, the reaction between (a) and (d) is represented by $[R'NH-R-NHR']_n + [ClOC-R-COCl]_n \rightarrow [-R'N-R-NR'OC-R-CO-]_n + nHCl$, the reaction between (b) and (d) is represented by $[HO-R-OH]_n + [ClOC-R-COCl]_n \rightarrow [-O-R-OCO-R-CO-]_n + nHCl$, and the reaction between (c) and (f) is represented by $[HS-R-SH_n + COCl_2]_n \rightarrow [-S-R-SCO-]_n + nHCl$. All these reactions are polycondensation reactions, which produce the polymer, while simultaneously yielding HCl as by-product.

Due to the aforementioned two major differences, i.e. the type of reaction and the kind of the reactants to be used, the two patents above referred to do not suggest the process of the present invention, in which (1) the polyaddition reaction, totally different from the polycondensation reaction mechanism of the patents, takes place at the interface of the reactants, (2) a polymer film can be produced at the interface of the two liquids and (3) when produced, the polymer film works to perfectly envelop fine drops of the dispersed liquid as micro-capsules.

The reasons for the above are as follows:

1. Since the microcapsules, each enveloping a fine drop of dispersed liquid, are produced by causing these reactants to react with each other in the system where two liquids which are mutually immiscible are present, there exists a natural restriction on the agitating strength and reaction conditions such as reaction temperature, reaction time, viscosity, specific gravity, etc., of the reaction system. However, merely because a polycondensation reaction, which itself as a fast reaction, takes place within these limited conditions, it cannot be predicted at all whether polyaddition, the reaction speed of which is only a small fraction of that of the polycondensation reaction, will take place.

2. Since the polymer is produced in a liquid, there is a great possibility of the polymer precipitating prior to the time when the polymerization reaction proceeds sufficiently towards completion. In the event that the polymer obtained from incomplete polymerization precipitates from the liquid, the capsules with such polymer utilized as the enveloping shell are extremely weak and the encapsulated liquid permeates the capsule shell, which becomes of no use for industrial purposes. On account of the reaction proceeding in the liquid, it is not at all possible to foresee and predict to what extent the liquid becomes an obstruction against the complete reaction of the reactants.

3. In the case of producing microcapsules by the interface reaction, the quality of the film for the capsule depends on the combination of a pair of the reactants. Therefore, even if many kinds of reactants have been known already, it cannot be predicted which combinations of reactants would complete the reaction at the interface of the two liquids, and whether the polymer thus obtained will be suitable for the capsule shell or not.

It has already been known to the present inventors that the method of producing microcapsules by forming a polymer through reaction of a pair of reactants at the interface of two liquids and by enveloping fine drops of a liquid dispersed in another liquid in an effective one, and that when the microcapsules are produced by the polycondensation polymerization, capsules of poor quality are obtained. The reasons for this are as follows.

a. As already shown in the foregoing equations for the polycondensation reaction, when a pair of reactants react, hydrogen chloride gas is by-produced at the interface of the two liquids somewhat to the side of the organic liquid phase, and the gas passes through the polymer film at the organic liquid side where the gas is being generated, and dissolves into the water phase of the opposite side, thus causing the final capsules to become porous and of insufficient strength.

b. As the polycondensation reaction proceeds rapidly as mentioned above, the capsule film is completely formed before the fine drops of the dispersed liquid uniformly disperse in perfect spherical form.

c. The polycondensation reaction is apt to be affected largely by purity of the reactants and impurities existing in the reaction system, hence polymerization does not proceed sufficiently in many cases.

U.S. Pat. No. 3,074,845 discloses a method of coating particles by amido-aldehyde resins. This method, however, does not use two reactants in the state of their being contained separately in both hydrophilic liquid and hydrophobic liquid, hence the reaction apparently does not take place at the interface of the two liquids to form a polymer film. No interface reaction is suggested in this patented invention. In fact, it is impossible to cause the interface reaction by putting amines or amides in the hydrophilic liquid and aldehydes into the hydrophobic liquid, so that no capsules containing fine drops of dispersed liquid therein can be produced.

Further, in U.S. Pat. No. 3,069,370, there is disclosed use of styrene maleic acid copolymer (high molecular compound) as the capsule shell. However, this method is a coacervation method which encapsulates lipophilic material by physically lowering the solubility of styrene maleic acid copolymer dissolved in an aqueous liquid whereby the styrene maleic acid copolymer is precipitated. Accordingly, the styrene maleic acid copolymer for the capsule shell is neither insolubilized through chemical reaction, nor is it subjected to the interface reaction. For the above reasoning, combination of styrene maleic acid copolymer and other reactants is not required in this patent.

SUMMARY OF INVENTION

As the result of a long period of researches and studies made by the present inventors on the method of producing microcapsules through the interface reaction, it has been found that when the polyaddition reaction is caused to take place at the interface of two liquids of the reactants in the definite combinations as will be described hereinafter, the reaction proceeds sufficiently without generating the byproduct gas, a polymer of high molecular weight can be formed, and that excellent micro-capsules could be obtained from the polymer film which has no pin-holes, is high in strength, and is capable of enveloping fine drops of dispersed liquid. Also, it has been found that the capsules do not allow the enveloped liquid to seep out, and are durable against heat, light, and external atmosphere to stably protect the encapsulated liquid. For instance, even toluene which evaporates rapidly when exposed to the external atmosphere could be stably enveloped within the capsule shell over several years.

DETAILED DESCRIPTION OF THE INVENTION

In the present invention, it has been discovered that superior quality of capsules is producible by proper combination of the reactants as will be described hereinafter.

The present invention, as already mentioned in the foregoing, provides a method for producing capsules, in which fine drops of any one of two types of liquids are enveloped, by first causing a particular pair of reactants to undergo a polyaddition reaction, each member of the pair being the hydrophobic liquid itself or the hydrophilic liquid itself, or being individually included in two separate liquids of hydrophilic and hydrophobic natures. Therefore, the adjustment of the reaction conditions is very simple, and the thickness of the capsule wall be be adjusted by only varying the quantities of the two reacting substances. Furthermore, strong capsule walls are formed in a short reaction time, and only capsules positively enveloping the liquid are obtained. In particular, as the capsules formed by the polyaddition reaction have no pin-holes at all in the film, the texture of the capsules is fine, and the strength thereof is very high. Therefore, there is little possibility of the destruction of the capsules in handling and resultant seepage of the liquid from within. Moreover, the liquid is protected for a long time from heat, light, outside air, and other adverse conditions.

Fine drops of either a hydrophilic liquid or a hydrophobic liquid can be readily enveloped according to the present invention. The following description will first discuss the case of enveloping fine drops of a hydrophobic liquid.

A first reactant is selected from among a hydrophobic liquid itself and a substance soluble in a hydrophobic medium, and a second reactant is selected from among a hydrophilic liquid itself and a substance soluble in such hydrophilic medium. These two reactants are then paired in proper combination in such a manner that they react with each other at the interface between the hydrophobic liquid and the hydrophilic liquid to cause polyaddition of the substance and to thereby produce a polymer film which is insoluble in both hydrophobic and hydrophilic liquid.

After the desired combination of these two reactants is determined, the hydrophobic liquid containing the first reactant therein, or being the first reactant is dispersed, in the form of fine drops, into the hydrophilic liquid containing the second reactant therein, or being the second reactant thereby causing the polyaddition between the two reactants at the interface of the two liquids to produce a polymer film insoluble in both liquids, whereby the fine drops of the hydrophobic liquid dispersed in the hydrophilic liquid can be enveloped by the polymer film.

The case in which a hydrophilic liquid is enveloped will now be considered.

By using the various combinations of the first and second reactants as explained immediately above, the hydrophilic liquid containing the second reactant therein, or being the second reactant is dispersed, in the form of fine drops, into the hydrophobic liquid containing the first reactant therein, or being the first reactant, thereby causing the same polyaddition reaction as above to take place at the interface of the two liquids to envelope the fine drops of the hydrophilic liquid.

In the above-described manner, according to the present invention, both hydrophobic and hydrophilic liquids can be easily enveloped in the form of fine drops by an insoluble tunic.

The first reactant, namely, hydrophobic liquid or substance soluble in a hydrophobic medium is selected from epoxy compounds, such as polyesters containing epoxy groups, epoxy resins and epichlorohydrin. The second reactant, namely, hydrophilic liquid or substance soluble in a hydrophilic medium is selected from polyamines and their derivatives. The combination of two such reactants results in a polyaddition reaction and resultant formation of a ring-opening polymer.

In the following Table, which shows combinations of the two reactants, the hydrophobic liquid itself or the reactants soluble in the hydrophobic medium are denoted as "A substance," and the hydrophilic liquid itself or the reactants soluble in the hydrophilic medium are denoted as "B substance." It should, however, be noted that the present invention is not restricted to these pairs of the reactants, but emcompass any substances equivalent thereto.

The hydrophilic media employed in this invention are those which have a relatively high attractive power for polar media with a high dielectric constant, which do not dissolve in the respective hydrophobic liquids employed in combination, and which dissolve in B sub- Table

| No. | A Substance | B Substance |
| --- | --- | --- |
| 1 | Polyester containing epoxy groups | Ethylene diamine<br>Trimethylene diamine<br>Tetramethylene diamine |
|  | Epoxy resin<br>etc. | Pentamethylene diamine<br>Hexamethylene diamine |
|  |  | p-Phenylene diamine<br>m-Phenylene diamine<br>Piperazine<br>2-Methyl piperazine<br>2,5-Dimethyl piperazine<br>2-Hydroxy trimethylene diamine<br>Diethylene triamine<br>Triethylene tetramine<br>Diethyl amino propyl amine<br>Tetraethylene pentamine<br>Epoxy resin-amine addition compounds<br>etc. |
| 2 | Epichlorohydrin<br>etc. | Tetramethylene diamine<br>Pentamethylene diamine<br>Hexamethylene diamine<br>Epoxy resin-amine addition compounds<br>etc. | stances listed in the Table. Examples of these hydrophilic media are water, acetone, methanol, ethanol, propanol, ethylene glycol, glycerine, 1,4-butanediol, phenol, polyethylene glycol, polyethyleneglycol oleylether, and polyoxyethylene-sorbitane-monooleate.

Substances capable of dissolving or dispersing in a hydrophilic medium can be added to and contained in the above-mentioned hydrophilic media, this feature constituting a unique characteristic of this invention. That is to say, hydrophilic liquids containing these added substances can be enveloped in fine drops to form capsules. As examples of hydrophilic liquids which can be thus contained in capsules according to this invention, the following materials can be cited: various inks, pigment paints, copying materials for copying papers, adhesives, developing and fixing agents for photography, beverages, condiments, agricultural chemicals, medicines, electrolyte solution, fertilizer solutions, various synthetic resin liquids, interfacial activators and their solutions.

The hydrophobic media employed in this invention are those which have a relatively high attractive power for a non-polar medium with a low dielectric constant, which do not dissolve in the respective hydrophilic liquids employed in combination, and which dissolve the A substances listed in the Table. Examples of such hydrophobic liquids are: castor oil, arachis oil, whale oil, turpentine oil, lard oil, dynamo oil, spindle oil, dichlorodiphenyl, silicone oil, paraffin chloride, oleic acid, diethyl phthalate, thricresyl phosphate, ethyl acetate, butyl acetate, methyl oleate, methyl-isobutyl ketone, cyclohexanone, octyl alcohol, benzyl alcohol, cyclohexanol, benzene, xylene, cyclohexane, monochlorobenzene, benzyl chloride, methylene chloride, cresol, carbon tetrachloride, trichlene, tetrachloroethane, heptane, octane, carbon bisulfide, benzaldehyde, caproyl aldehyde, and sorbitanemonooleate.

Substances capable of dissolving or dispersing in a hydrophobic medium can be added and contained in the above-mentioned hydrophobic media, this feature constituting a unique characteristic of this invention. That is, hydrophobic liquids containing added substances can be enveloped in the form of fine drops in capsules. As examples of hydrophobic liquids which can be thus contained in capsules according to this invention, the following materials can be cited: various inks, pigment paints, core materials for writing, copying materials for copying paper, adhesives, paints, spices, fuels, medicines, various synthetic resin luquids, and solvents.

In the practice of this invention, when an A substance is itself a hydrophobic liquid, this substance can be used as it is, without being dissolved in another hydrophobic medium, and when a B substance is itself a hydrophilic liquid, this substance can be used as it is, without being dissolved in another hydrophilic medium. Accordingly, it should be understood that the expressions "a hydrophobic liquid containing an A substance" and "a hydrophilic liquid containing a B substance" used herein are intended to include the case where "a hydrophobic liquid containing an A substance" is the A substance itself and the case where "a hydrophilic liquid containing a B substance" is the B substance itself.

The following examples more fully illustrate the nature of the invention, but are not to be considered as restricting the invention thereto. In addition, the A substance and B substance can be added to a diluent and caused to react without directly mixing the respective hydrophilic and hydrophobic liquids containing these substances. The same interfacial reaction as has been described above takes place also in this case, and therefore this too constitutes an embodiment of the invention.

DESCRIPTION OF THE PREFERRED EMBODIMENTS

Example 1

1 gram of paraffin wax is dissolved in 10 cc of dynamo oil at 80°C, and then into this solution 3 grams of Cyanine Blue (C.I. No. 74,160) is added and mixed well. Further, in this solution, 3 grams of Epikote 828 (liquid diglycidyl ether of biphenol A having an epoxy equivalent weight of 185–192 and a viscosity of 10,000–16,000 centipoises at 25°C, produced by Shell Chemical Corp., U S A ) is dispersed to produce a solution which is called hereinbelow the "first liquid." Separately, 3 grams of tetraethylene pentamine and 10 grams of gum arabic are dissolved in 600 cc of water, this solution being called the "second liquid." The first liquid is dropped as fine drops into the second liquid regulated at 50°C to disperse the first liquid. When this condition of dispersion is continued for about 20 hours, whereby at the interfaces between the fine drops of the first liquid and the second liquid Epikote 828 and tetraethylene pentamine react with each other, a tunic insoluble in the first and second liquids is thereby formed, this tunic enveloping the first liquid to form capsules containing the first liquid.

These capsules can be used to produce carbon paper which will not smear when it is applied to a supporting medium.

Example 2

0.5 gram of the curing agent U for epoxy resin (an amber-colored liquid amine curing agent for epoxy resin having a viscosity of approximately 10,000 centipoises, produced by the Shell Chemical Corporation, U.S.A.), and amine addition product of an epoxy compound and 2 grams of sodium chloride are dissolved in 10 cc of water, this solution being called the "first liquid." Separately, 1.5 grams of epichlorohydrin and 0.1 gram of Saran F-200 (a copolymer of vinylidene chloride and acrylonitrile produced by the Dow Chemical Company of U.S.A.) are dissolved in 100 cc of butyl acetate, this solution being called the "second liquid." The first liquid is dropped into the second liquid to disperse the first liquid, and this condition of dispersion is maintained for about 20 hours while the temperature of the dispersion is regulated at 40°C. As a result, at the interfaces between the fine drops of the first liquid and the second liquid, the curing agent U and epichlorohydrin react with each other to form a tunic insoluble in the first and second liquids, this tunic enveloping the first liquid to form capsules containing the first liquid.

These capsules can be used to produce a solid electrolyte material which becomes effective upon being crushed by pressing.

Example 3

2.5 grams of the curing agent U for epoxy resin is dissolved in 20 cc of water, this solution being called the "first liquid." Separately, 7 grams of Epikote 834 (liquid diglycidyl ether of biphenol A having an epoxy equivalent weight of 230–280 and a Durran's m.p. of 35°–40°C, produced by the Shell Chemical Corporation, U.S.A.) and 0.5 gram of polyvinylacetal are dissolved in 250 cc of benzene, this solution being called the "second liquid."

The first liquid is dropped into the second liquid to disperse the first liquid, and this condition of dispersion is maintained for about 35 hours while the temperature of the dispersion is regulated at 35°C. As a result, at the interfaces between the fine drops of the first liquid and the second liquid, the curing agent U and Epikote 834 react with each other to form a tunic insoluble in the first and second liquids, this tunic enveloping the first liquid to form capsules containing the first liquid.

These capsules can be used to handle water as a solid body.

We claim:

1. A process for encapsulating or enveloping fine drops of a dispersed liquid which comprises
   a. preparing
      1. a hydrophobic liquid A which is or contains epichlorohydrin as a first substance and
      2. a hydrophilic liquid B which is or contains a polyamine selected from the group consisting of tetramethylene diamine, pentamethylene diamine, hexamethylene diamine and an epoxy resin-amine addition compound as a second substance, and
   b. dispersing the liquid A, in the form of fine drops, into the liquid B to cause the first and second substances to react at the interface between liquids A and B, thereby causing a polyaddition reaction at the interface of liquids A and B to produce a polyaddition polymerizate which is insoluble in both liquids A and B, whereby fine drops of the dispersed liquid are encapsulated or enveloped by the polymerizate.

2. A process for encapsulating or enveloping fine drops of a dispersed liquid which comprises
   a. preparing
      1. a hydrophobic liquid A which is or contains epichlorohydrin as a first substance and
      2. a hydrophilic liquid B which is or contains a polyamine selected from the group consisting of tetramethylene diamine, pentamethylene diamine, hexamethylene diamine and an epoxy resin-amine addition compound as a second substance, and
   b. dispersing the liquid B, in the form of fine drops, into the liquid A to cause the first and second substances to react at the interface between liquids A and B, thereby causing a polyaddition reaction at the interface of liquids A and B to produce a polyaddition polymerizate which is insoluble in both liquids A and B, whereby fine drops of the dispersed liquid are encapsulated or enveloped by the polymerizate.

* * * * *